Nov. 2, 1943.    J. H. MOORE    2,333,546
REPAIR VULCANIZER
Filed Oct. 19, 1940
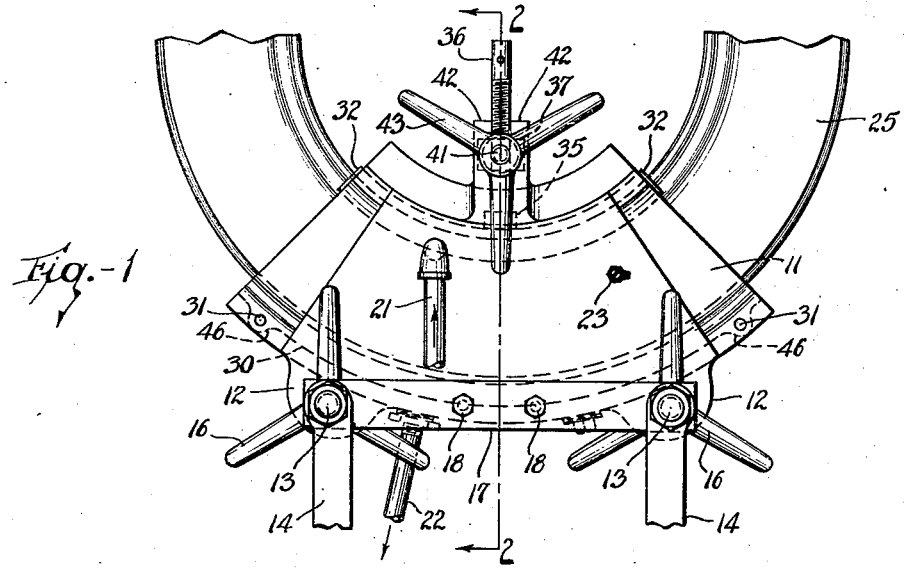
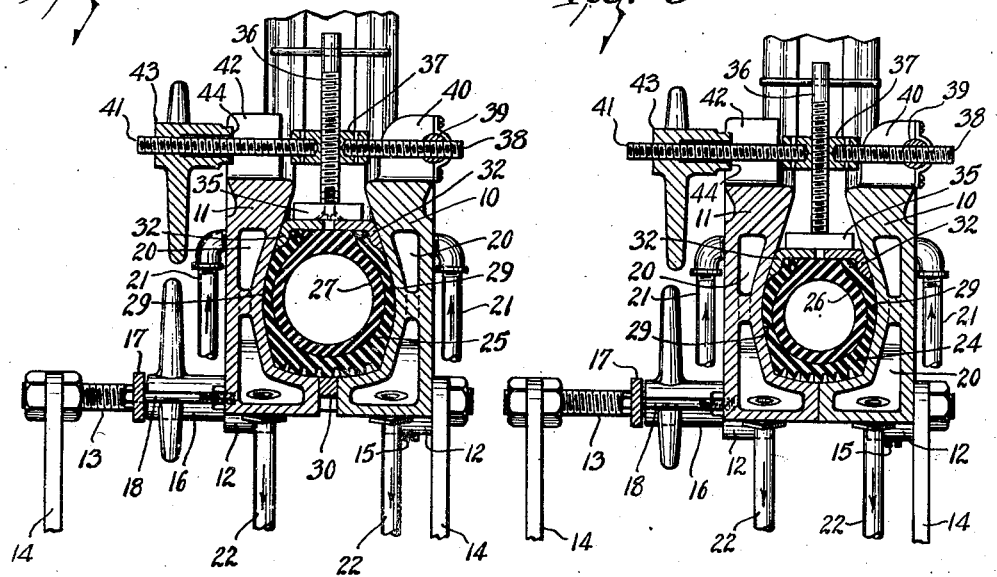
INVENTOR
JAMES H. MOORE
BY
ATTORNEYS Patented Nov. 2, 1943

2,333,546

UNITED STATES PATENT OFFICE 2,333,546

REPAIR VULCANIZER

James H. Moore, Akron, Ohio

Application October 19, 1940, Serial No. 361,914

6 Claims. (Cl. 18—18)

This invention relates to repair vulcanizers for pneumatic tire casings, and more especially it relates to repair vulcanizers of the type employed for vulcanizing repairs in local regions of the sidewalls of tire casings.

The chief objects of the invention are to provide a superior repair vulcanizer of the character mentioned; to provide a repair vulcanizer capable of treating tires of various sizes; and to provide readily for adjusting the vulcanizer to tires of different sizes. Simplicity of construction and facility of operation also are objects to be achieved. Other objects will be manifest as the specification proceeds.

Of the accompanying drawing:

Figure 1 is a side elevation of a repair vulcanizer embodying the invention, and a tire therein;

Figure 2 is a section on the line 2—2 of Fig. 1; and

Figure 3 is a section similar to Fig. 2 showing the arrangement of the elements of the vulcanizer when vulcanizing a tire of smaller size.

Referring now to the drawing it will be seen that the improved vulcanizer comprises a pair of longitudinally arcuate side sections designated as a whole by the numerals 10 and 11, which sections each constitute 90° of a full circle. The convex or peripheral wall of each side section is formed near the respective ends thereof with transversely apertured lugs 12, 12 in which are received respective supporting rods, 13, 13, the latter being parallel to the axis of the sections and parallel to each other. The rods 13 are supported from their respective ends by legs or standards 14 of proper height to position the vulcanizer for convenient manipulation. The sections 10, 11 require to be adjustable laterally from and toward each other to accommodate tires of various sizes, and to this end the section 10 is fixedly positioned by means of set screws, such as the set screw 15, that are threaded through its respective lugs 12 into engagement with the rods 13 that extend therethrough. The section 11 is movable axially along the rods 13, the latter being of such length as to permit the necessary amplitude of movement. For so moving the section 11, the rods 13 are suitably threaded as shown, and respective nuts 16 are mounted upon the threaded portions thereof, said nuts being provided with radial wings or arms to facilitate manual turning of the nuts. The nuts 16, when threaded toward the right as viewed in Figs. 2 and 3, engage the outer lateral face of section 11 and urge the section toward the stationary section 10. Positioned closely adjacent the opposite ends of nuts 16 is a bar 17 that is slidable along the rods 13, and is secured to the section 11, intermediate said rods, by elongated screws 18. The arrangement is such that when the nuts 16 are threaded along rods 13, to the left as shown in Figs. 2 and 3, they engage opposite end portions of the bar 17, and by moving the latter, also move the vulcanizer section 11 away from section 10. The bar 17 also assists in maintaining the section 11 in parallelism with section 10 during relative lateral movement of the said sections.

For effecting vulcanization of a tire repair, the sections 10, 11 are arranged to be heated, and to this end each section is jacketed in its medial region to provide a steam chamber 20. Longitudinally of the sections, the steam jackets terminate somewhat short of the ends thereof. Transversely of the sections, the steam jackets are disposed on the sides and on the peripheral portion thereof, the latter portion being at the bottom of the section. The arrangement is such that heat may be applied to both sidewalls and to the tread portion of a tire mounted in the vulcanizer. For supplying steam to the vulcanizer sections, respective inlet pipes 21 are provided, which pipes discharge into the respective steam chambers 20 at the top thereof. Respective drain pipes 22 communicate with the chambers 20 at the bottom thereof. The steam chambers are provided with respective bleeder valves 23 for venting air from the chambers when steam is first introduced thereinto.

As previously stated, the vulcanizer section 11 is movable from and toward the section 10, thus enabling the sections to be separated for the mounting of a tire therebetween, and for removing the tire after vulcanization has been effected. Tires are mounted in the vulcanizer in vertical position, with the axis of rotation of the tire disposed above the vulcanizer, with the result that within the vulcanizer the tread portion of the tire is downwardly directed, and the bead portion of the tire is uppermost. As hereinbefore stated, the vulcanizer is adapted for the treatment of tires of various sizes, a segment of one of the smaller size tires being shown at 24, Fig. 3; and a somewhat larger size tire being shown at 25, Figs. 1 and 2. Within said tires are respective sectional expansible cores 26, 27 by means of which heat and pressure are applied interiorly of the local regions of the tires that are enclosed by the vulcanizer, as is well understood in the art.

The confronting faces of the vulcanizer sections 10, 11 are formed with respective recesses or cavities 29 in which a tire casing is receivable, each of said cavities comprising a bottom wall against which the tread portion of the tire will bear, and a lateral wall against which a sidewall of the tire will bear. The cavity of each mold section is longitudinally arcuate, the axis about which the arc is generated being coincident with the axis of a tire of a much used size. In the embodiment of the invention shown, this tire is assumed to be a 6.00" x 16" size, and the longitudinal curvature of the tread portion of each cavity 29 has a radius of 14½", since the outside diameter of a 6.00" x 16" tire is 29". It is desired, however, that the vulcanizer be adapted to receive tires as small as 4.75" x 19" and as large as 7.00" x 18". To this end the transverse dimension of the tread region of each recesses 29 is made the same as half the tread width of a 4.75" x 19" tire, the arrangement being such that the confronting sides of the sections 10, 11 will be in laterally abutting relation, as shown in Fig. 3, when this small size tire is mounted for treatment in the vulcanizer. Larger size tires have treads of proportionally greater width, and to accommodate such tires a plurality of spacer members 30 of various widths may be provided. The spacer members 30 are longitudinally arcuate, their concave sides having the same radius as the tread portions of the cavities 29. The spacer members are mountable between the confronting sides of the sections 10, 11, and are properly positioned thereat by dowel pins 31, 31 in one of said sections which extend through apertured ears 46, 46 on the convex side of each member. The dowels 31 support the spacer members so that their concave sides are flush with the tread-engaging regions of the cavities 29, as is clearly shown in Fig. 2.

The sides of the cavities 29, which engage the sidewalls of a tire, extend upwardly from the tread engaging portions of the cavities in a radial direction, said sidewalls being substantially flat and divergent for a short distance from their juncture with the tread-engaging portions, being arcuate in the medial region of the sidewalls of a tire, and being flat and convergent therebeyond to the longitudinally concave face of the vulcanizer, which is at the top thereof and somewhat above the bead portions at the inner circumference of a tire received therein. The angle at which the convergent sides of the molding cavities approach each other is an important feature of the invention, as presently will appear, experience having shown that an angle of about 18° from the vertical, in each molding cavity, giving optimum results to the end in view.

Mountable within the cavity of the vulcanizer are two identical bead-engaging members 32, 32 adapted for engagement with the respective beads of a tire mounted therein. The bead-engaging members are generally L-shaped in transverse section so as to engage the inner circumference of a tire and the contiguous lateral surface thereof, the transverse width of said members being such that their adjacent margins are slightly spaced apart, as shown, under operative conditions. The members 32 are longitudinally arcuate, the peripheral portion that engages the inner circumference of a tire being generated on an 8" radius. Thus the members 32 are adapted to fit flush against the beads of a tire having a 16 inch inside diameter, which size is most extensively used for tires of the sizes which this vulcanizer is designed to handle. The outer lateral faces of the members 32 are arranged to make contact with the converging surfaces of the cavities 29, and to this end said lateral faces are sloped or inclined complementally to the slope of the converging faces of said cavities, that is, at an angle of 18° to the vertical plane of the vulcanizer. The arrangement is such that the confronting faces of the members 32 and the respective cavities 29 will maintain a substantial area of contact with each other in all positions of adjustment of the vulcanizer. When the vulcanizer sections 10, 11 are close together, as shown in Fig. 3, for repairing a small size tire of say 5.00" x 19", the bead-engaging members 32 are in lower position than shown in Fig. 2 where they engage the beads of a tire of 6.00" x 16" size, and the sections 10, 11 are spaced farther apart to accommodate the larger tire. However, because of the specific angle of taper between the confronting faces of the recesses 29 and bead-engaging members 32, such adjustment of the latter radially of the vulcanizer does not result in any change in the distance that one member 32 is spaced laterally of the other member 32.

The vulcanizer is designed especially for the repair of tires of 6.00" x 16" size, such tires fitting perfectly within the cavities 29, the periphery of the bead-engaging members 32 fitting perfectly against the inner circumferential surfaces of the tire, and the inclined confronting faces of the cavities and the members 32 fitting flush against each other at all points. When tires of larger or smaller outside diameter are repaired, the flexibility of the tire enables it readily to conform to the shape of the cavities 29. In like manner, when the tires are of larger inside diameter, the bead portions thereof readily flex into conformity with the curvature of the members 32. The latter however, when engaged with tires of other than 16" inside diameter, do not as well fit the tapered surfaces of the cavities, and may require to rock slightly, relatively of each other, in making contact with said cavity surfaces over the greatest possible area. This the bead-engaging members readily may do since they are always spaced slightly apart from each other.

For holding the members 32 in operative position against a tire in the vulcanizer, a pressure foot or block 35 is provided, said pressure foot being of rectangular shape and arranged to engage the upper or concave side of the bead-engaging members 32 midway between the ends thereof, said pressure foot spanning the gap between the adjacent margins of said members. The pressure foot 35 is swiveled on the lower end of a handscrew 36 that is threaded through a block 37, the upper end of screw 36 being provided with a handle by means of which manual rotation may be effected. Secured to block 37 and extending laterally therefrom transversely of screw 36 is a screw 38 that is threaded transversely through a pivot pin 39, the latter being journaled upon a horizontal axis upon a pair of spaced apart ears, such as the ears 40, formed upon the top of the vulcanizer section 10, centrally thereof, the screw 38 being disposed between said ears. Also secured to the block 37 and extending laterally from the opposite side thereof, in axial alignment with screw 38, is a screw 41 that extends through a slot between a pair of spaced-apart ears 42 formed on the top of the vulcanizer section 11 in transverse alignment with the ears 40 aforementioned. Threaded onto the free end of the screw is a nut 43 that is formed with radially extending hand-grip portions by means of which it is manually rotated. The nut 43 is cylindrical in shape and has a reduced end portion confronting the ears 42, which end portion is receivable in a recess or counterbore 44 in the said ears.

The arrangement is such that the block 37 and all parts connected thereto may be swung as a unit about the axis of pivot pin 39 to enable the spreading apart of the vulcanizer sections 10, 11, and to enable the work to be mounted in and removed from the vulcanizer. By reason of the threaded engagement of screw 38 with pivot pin 39, the screw may be moved axially relatively of said pivot pin, thereby effecting lateral adjustment of the block 37, to the end that the screw 36 and pressure foot 35 attached thereto always are positioned in the central plane of the work, regardless of the position of the vulcanizer section 11 laterally of the section 10. When the nut 43 is engaged in the counterbore 44 of ears 42, the pressure foot 35 cannot be raised regardless of the pressure of work against the bead-engaging members 32.

The steam chambers 20 in the sections 10, 11 are of such extent as to provide heat to the entire sidewalls of a tire and the major portion of the tread thereof, thereby enabling the vulcanizer to repair practically all damage to which pneumatic tires normally are subject.

The invention is of relatively simple construction and may be manufactured at relatively low cost. The vulcanizer is capable of adjustment so as to accommodate tires of a number of different sizes, and it achieves the other advantages set out in the foregoing statement of objects.

Modification may be resorted to without departing from the spirit of the invention, or the scope thereof as defined by the appended claims.

What is claimed is:

1. In a vulcanizer of the character described, the combination of a pair of heatable vulcanizer sections adapted to confine a segment of a tire by engagement with the tread and opposite sidewalls thereof, a pair of longitudinally arcuate elements disposed between the vulcanizer sections engageable with the respective bead portions of said tire segment therein, the confronting faces of the vulcanizer sections being sloped so as to converge in a radially inward direction, the bead-engaging members being sloped complemental to respective sloped vulcanizer faces and in engagement therewith, means for moving the vulcanizer sections from and toward each other, and adjustably positionable means engaging the bead-engaging members locally in the medial region thereof for holding them against the work in the vulcanizer.

2. In a vulcanizer of the character described, the combination of a pair of heatable vulcanizer sections adapted to confine a segment of a tire by engagement with the tread portion and sidewalls thereof, means for adjusting said sections from and toward each other to accommodate tires of various sizes, and longitudinally arcuate bead-engaging means disposed between the vulcanizer sections adapted to engage the respective bead portions of the tire segment therein, the confronting faces of the vulcanizer sections and the bead-engaging means being in contact with each other and complementally sloped so as to converge in a radially inward direction in the operative position of the vulcanizer at such an angle that lateral adjustment of the vulcanizer sections to accommodate tires of different sizes results in a re-positioning of the bead-engaging means radially of the tire segment, the extent of such re-positioning being a determinate proportion of the extent of lateral adjustment of the vulcanizer sections.

3. In a vulcanizer of the character described, the combination of a pair of heatable, arcuate vulcanizer sections arranged with concave sides uppermost and adapted to confine a segment of a tire by engagement with the tread portion and sidewalls thereof, the tire-engaging surfaces of the sections adjacent the bead portions of the tire converging laterally toward each other in a radially inward direction, means for adjusting said sections from and toward each other to accommodate tires of various sizes, a pair of longitudinally arcuate members disposed in laterally spaced apart relation between said sections in engagement with the respective bead portions of a tire segment therein, the outer lateral face of each bead-engaging member being tapered complemental to the slope of the confronting face of the vulcanizer section, which slope is such that the bead-engaging members are in contact with said sloped faces and are substantially the same distance apart from each other in all operative positions of relative adjustment of the vulcanizer sections, and a laterally adjustable pressure foot engaging the bead-engaging members locally midway between their ends.

4. In a vulcanizer of the character described, the combination of a pair of arcuate heatable vulcanizer sections adapted to confine a segment of a tire by engagement with the tread and respective sidewalls thereof, and a pair of arcuate members disposed between the vulcanizer sections and adapted to engage the respective bead portions of said tire segment therein, each of the confronting faces of the vulcanizer sections and the bead-engaging members being complementally sloped toward the central plane of the vulcanizer in a radially inward direction and being in contact with each other, said slope being substantially 18 degrees.

5. A combination as defined in claim 4 in which the bead-engaging members are laterally spaced apart from each other a distance which is substantially constant in all operative positions of width-adjustment of the vulcanizer.

6. In a vulcanizer of the character described, the combination of a pair of longitudinally arcuate heatable vulcanizer sections formed with a cavity adapted to confine a segment of tire by engagement with the tread and respective sidewalls thereof, the radially innermost sides of the sections being disposed uppermost the sidewall-engaging walls of said cavity converging toward each other from the medial region of the sidewalls of the tire to the radially innermost side of the vulcanizer, the convergence of each wall being at substantially 18 degrees to the central plane of the vulcanizer, means for adjusting the vulcanizer sections laterally from and toward each other, longitudinally arcuate tire-bead-engaging means within the vulcanizer cavity, and means for holding the last-mentioned means against the tire beads.

JAMES H. MOORE.